(12) United States Patent
Fukuda et al.

(10) Patent No.: US 10,107,341 B2
(45) Date of Patent: Oct. 23, 2018

(54) CLUTCH CONTROL DEVICE FOR WORK MACHINE

(71) Applicant: Hitachi Construction Machinery Co., Ltd., Tokyo (JP)

(72) Inventors: Naoki Fukuda, Tsuchiura (JP); Tadashi Osaka, Kashiwa (JP); Ryuji Kouno, Mito (JP); Masatsugu Arai, Kasumigaura (JP); Takanobu Ikari, Tsuchiura (JP); Takaaki Tanaka, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 52 days.

(21) Appl. No.: 15/451,455

(22) Filed: Mar. 7, 2017

(65) Prior Publication Data

US 2018/0087587 A1    Mar. 29, 2018

(30) Foreign Application Priority Data

Sep. 29, 2016 (JP) .................................. 2016-192116

(51) Int. Cl.
    *F16D 48/06*    (2006.01)

(52) U.S. Cl.
    CPC ...... *F16D 48/06* (2013.01); *F16D 2500/3056* (2013.01); *F16D 2500/3067* (2013.01); *F16D 2500/30426* (2013.01); *F16D 2500/7061* (2013.01); *F16D 2500/70442* (2013.01); *F16D 2500/70446* (2013.01); *F16D 2500/7101* (2013.01)

(58) Field of Classification Search
    None
    See application file for complete search history.

(56) References Cited

U.S. PATENT DOCUMENTS

| | | | | |
|---|---|---|---|---|
| 6,648,115 B2* | 11/2003 | Smith | ..................... | F16D 35/02 192/21.5 |
| 7,311,185 B2* | 12/2007 | Smith | ..................... | F01P 7/042 123/41.12 |
| 7,708,127 B2 | 5/2010 | Turley et al. | | |

(Continued)

FOREIGN PATENT DOCUMENTS

DE    197 10 384 A1    9/1998
GB    2 419 690 A    5/2006

(Continued)

*Primary Examiner* — Dirk Wright
(74) *Attorney, Agent, or Firm* — Mattingly & Malur, PC

(57) ABSTRACT

Provided is a clutch control device for a work machine capable of controlling a fan to an appropriate rotational speed. In the clutch control device for the work machine, a controller includes a target fan rotational speed calculation module that calculates a target fan rotational speed for the fan, a clutch characteristic curve storage module that stores a plurality of clutch characteristic curves, a clutch command calculation module that outputs with reference to a clutch characteristic curve a first clutch control signal corresponding to the target fan rotational speed, a feedback control module that output a second clutch control signal based on the difference between the target fan rotational speed and an actual fan rotational speed, and an adder that adds the first clutch control signal and the second clutch control signal to output a third clutch control signal.

5 Claims, 13 Drawing Sheets

(56) References Cited

U.S. PATENT DOCUMENTS

| | | | |
|---|---|---|---|
| 8,645,036 B2* | 2/2014 | Kiessner-Haiden | F16D 48/064 477/176 |
| 9,188,221 B2* | 11/2015 | Moorman | F16H 61/0251 |
| 9,376,954 B2* | 6/2016 | Noll | F01P 7/042 |
| 2006/0060443 A1 | 3/2006 | Smith et al. | |

FOREIGN PATENT DOCUMENTS

| | | |
|---|---|---|
| JP | 04-296227 A | 10/1992 |
| WO | 2012/083976 A1 | 6/2012 |

* cited by examiner

CLUTCH CONTROL DEVICE FOR WORK MACHINE

BACKGROUND

1. Field of the Invention

The present invention relates to a clutch control device for a work machine.

2. Description of the Related Art

As a background art in the present technical field, for example, Japanese Unexamined Patent Application Publication No. H4-296227 describes a configuration wherein "a slip control device is provided with a clutch characteristic curve memory, this memory stores position target signals in the form of a characteristic curve in dependence on data, the data representing rotational torques to be transmitted by a clutch at the target positions, the clutch characteristic curve memory outputs a position target signal in correspondence to an instantaneous rotational torque of an engine detected by a rotational torque detector, and the slip control device superposes the position target signal from the clutch characteristic curve memory on a control signal component generated by a controller of the slip control device" (refer to abstract).

However, wet friction clutches are of the configuration that lubrication is performed with oil (engine oil) between friction discs. Thus, in the wet friction clutches, a torque loss, a so-called drag torque attributed to the viscosity of the oil is generated even during the idling of the clutch. Since the drag torque changes in dependence on oil temperature and an input rotational speed, the clutch characteristic changes in dependence on the state in use of the clutch.

Accordingly, in approximating the rotational speed of a fan driven by an engine to a target rotational speed, there arises a problem that the response is delayed if consideration is not taken into a change in the clutch characteristic, so that it is difficult to control the rotational speed of the fan to a desired rotational speed. About this problem, nothing is described in the aforementioned Japanese publication.

Therefore, the present invention has been made taking the aforementioned circumstances into consideration, and it is an object of the present invention to provide a clutch control device for a work machine capable of controlling the rotational speed of a fan to an appropriate rotational speed.

SUMMARY

In order to accomplish the aforementioned object, the present invention being typical resides in a clutch control device for a work machine which comprises an engine, a wet clutch connected to the engine, a fan connected to an output shaft of the clutch, an engine rotational speed sensor for detecting the rotational speed of the engine, an oil temperature sensor for detecting a clutch oil temperature, a fan rotational speed sensor for detecting the rotational speed of the fan, and a controller for controlling the operation of the clutch, wherein the controller includes a target fan rotational speed calculation module that calculates a target fan rotational speed for the fan based on a clutch connection demand inputted, a clutch characteristic curve storage module that, in association with the oil temperatures of the clutch and the rotational speeds of the engine, stores a plurality of clutch characteristic curves each prescribing the relation between the target fan rotational speeds and control signals for the clutch, a clutch command calculation module that chooses one clutch characteristic curve from the plurality of clutch characteristic curves based on detection signals outputted from the oil temperature sensor and the engine rotational speed sensor and outputs with reference to the chosen clutch characteristic curve a first clutch control signal corresponding to the target fan rotational speed, a feedback control module that outputs a second clutch control signal based on the difference between the target fan rotational speed and an actual fan rotational speed of the fan outputted from the fan rotational speed sensor, and an adder that adds the first clutch control signal and the second clutch control signal to output a third clutch control signal to the clutch.

With the configuration described above of the present invention, it becomes possible to provide the clutch control device for the work machine capable of controlling the rotational speed of the fan to an appropriate rotational speed. Incidentally, other objects, configurations and advantageous effects than those as aforementioned will be clarified by the description of the following embodiments.

BRIEF DESCRIPTION OF THE DRAWINGS

Non-limiting and non-exhaustive embodiments of the present invention will be described with reference to the following drawings, wherein like reference signs refer to like or corresponding parts throughout various views unless otherwise specified.

DETAILED DESCRIPTION

Hereinafter, with reference to the drawings, description will be made regarding embodiments that implement a clutch control device for a work machine according to the present invention.

First Embodiment

Figure 1:
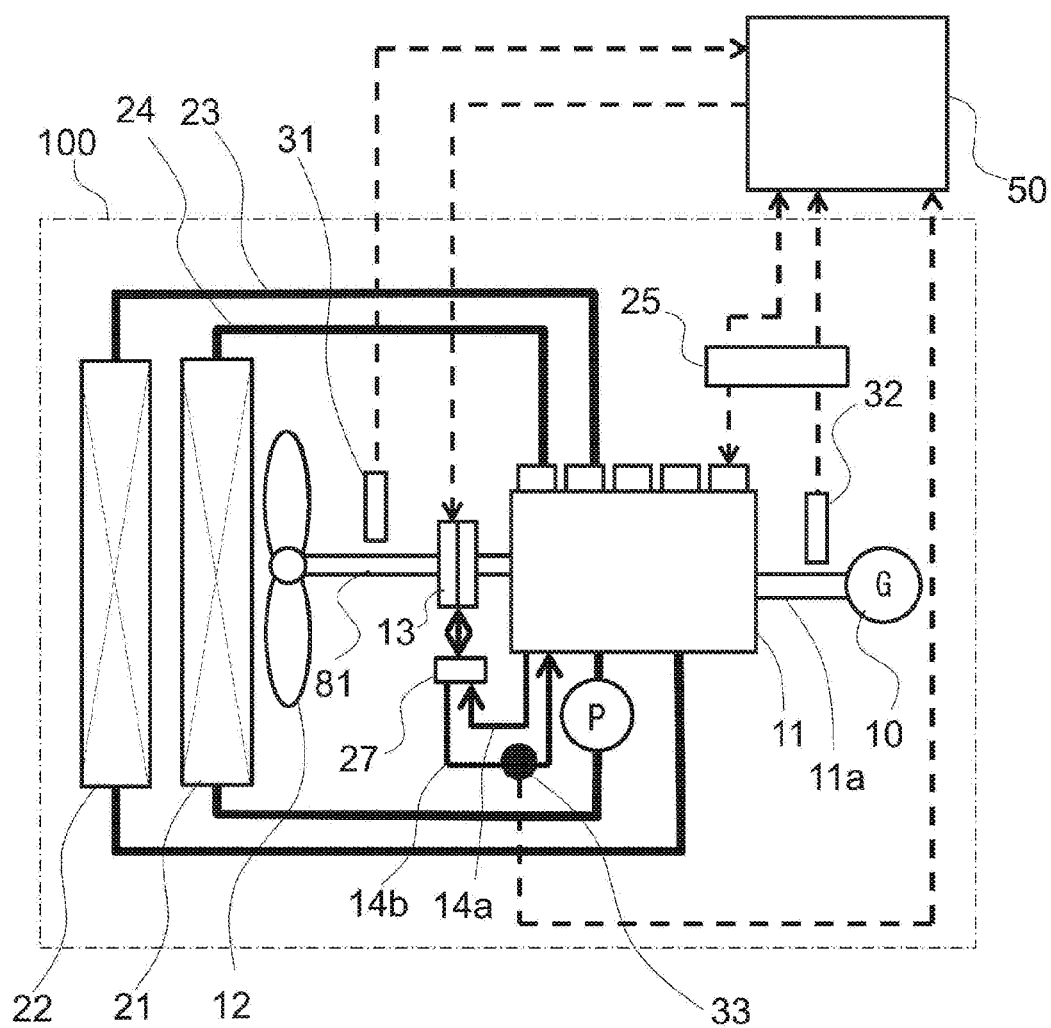
FIG. 1 is an illustration showing the overall configuration in an engine room of a work machine to which a clutch control device according to the present invention is applied.

FIG. 1 is an illustration showing the overall configuration in an engine room of a work machine to which a clutch control device according to the present invention is applied. Although the clutch control device according to the present invention is applicable to various work machines such as a hydraulic excavator, a wheel loader, a dump track and the like, the following description will be made taking an example in which the present invention is applied to a hydraulic excavator.

As shown in FIG. 1, an engine 11 as a prime mover is arranged in an engine room 100, and the engine 11 is connected to various devices such as, for example, a generator 10 through a drive shaft 11a. Further, an engine controller 25 is mounted on the engine 11, and the engine controller 25 executes monitoring the condition of the engine 11, adjusting the injection quantity of fuel in correspondence to a rotational speed command, and the like. Further, the engine 11 is connected through a pipe 24 to a radiator 21 for cooling coolant of the engine 11 and is also connected through a pipe 23 to an intercooler 22 for cooling intake gas compressed by a turbocharger. Incidentally, the coolant of the engine 11 is circulated by a pump (P) throughout the pipe 24.

A fan 12 is connected to the engine 11 through a clutch 13 and is rotated by the driving of the engine 11 to supply cooling air to the radiator 21 and the intercooler 22. The clutch 13 is supplied with engine oil from the engine 11 through oil pipes 14a, 14b. The oil pipes 14a, 14b are provided with a pressure control valve (for example, pressure reducing valve) 27 of the electromagnetic solenoid driving type for adjusting the pressure of the engine oil supplied to the clutch 13.

A controller 50 is arranged outside the engine room 100. After creating a rotational speed command for the engine 11, the controller 50 transmits the command to the engine controller 25 of the engine 11 and controls the connection/disconnection state of the clutch 13.

Further, as shown in FIG. 1, there are provided a fan rotational speed sensor 31 for measuring the rotational speed of the fan 12, an engine rotational speed sensor 32 for measuring the rotational speed of the drive shaft 11a of the engine 11 and an oil temperature sensor 33 for measuring the temperature of return oil from the clutch 13. The fan rotational speed sensor 31, the engine rotational speed sensor 32 and the oil temperature sensor 33 are connected to the controller 50.

Figure 2:
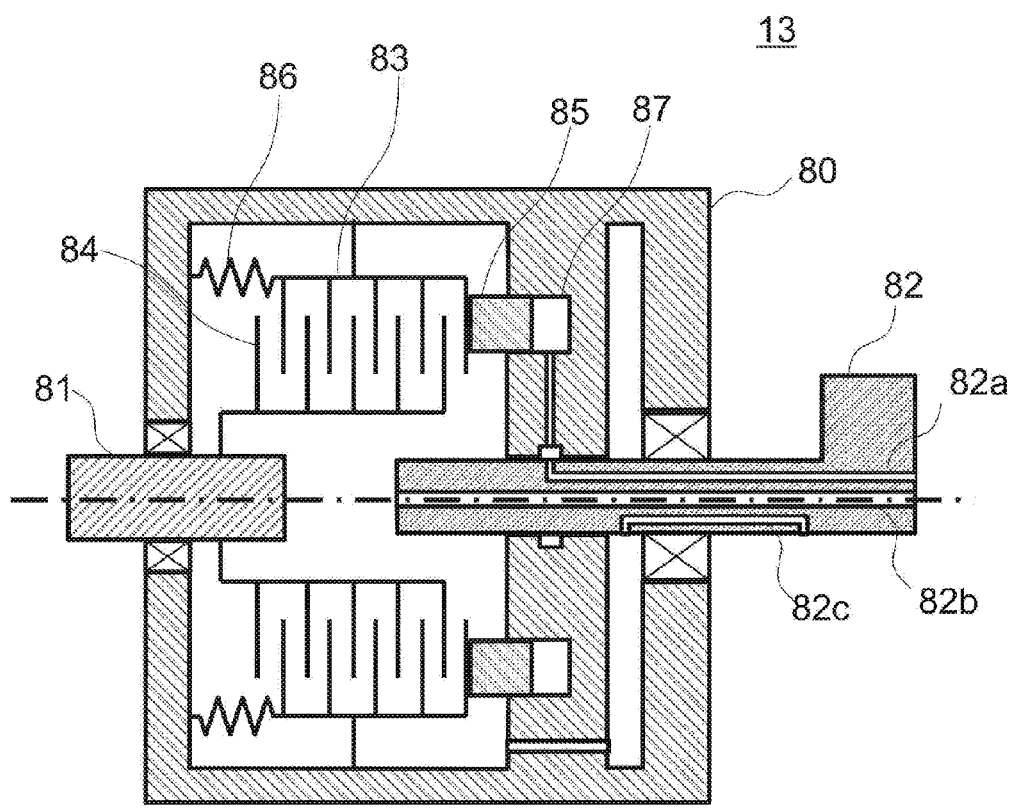
FIG. 2 is a schematic longitudinal sectional view of a clutch shown in FIG. 1.

Next, the construction of the clutch 13 will be described. FIG. 2 is a schematic longitudinal sectional view of the clutch 13 shown in FIG. 1. The clutch 13 illustrated in FIG. 2 is a multiple disc wet clutch being a kind of disc clutches and generates a friction force by contacting friction discs 83 being integral with an input shaft 80 with friction discs 84 being integral with an output shaft 81 to transmit the rotation of the input shaft 80 to the output shaft 81. Here, the multiple disc type means a clutch that plural pairs (five pairs in FIG. 2) each comprising a pair of friction discs 83, 84 are alternately arranged on the input shaft side and the output shaft side. Further, the wet type means a clutch of type that engine oil (hereinafter abbreviated as "oil" occasionally) is supplied between the respective pairs of friction discs 83, 84.

Specifically, the clutch 13 is composed of the input shaft 80, the output shaft 81, a fixed shaft 82, the friction discs 83 on the input shaft side, the friction discs 84 on the output shaft side, a piston 85 for pressing these friction discs 83 and 84, washer springs 86 for applying a force in the direction to separate the friction discs 83 and 84 from each other, a piston chamber 87 supplied with oil for applying a force to the piston 85, the pressure control valve 27 (refer to FIG. 1) for controlling the hydraulic pressure in the piston chamber 87, and other parts such as seal rings, bearings and retaining rings and the like (all not shown).

The fixed shaft 82 is fixed by a bolt (not shown) to the engine 11 and the input shaft 80 is driven by a belt (not shown) or the like. The fixed shaft 82 is provided in the fixed shaft 82 with an oil passage 82a communicating with the piston chamber 87, an oil passage 82b for supplying oil to the friction discs 83, 84 and an oil passage 82c for discharging the oil. Further, the fan 12 is fixed by a bolt or the like to the output shaft 81.

The engine controller 25 of the engine 11 creates a clutch connection demand Sc-e (refer to FIG. 3) from the operating state of the engine 11 and the temperatures of the coolant and the intake gas and outputs the clutch connection demand Sc-e to the controller 50. The clutch connection command Sc-e is outputted in the form of, for example, a duty ratio (one representing the time ratio of those being "High" of pulse signals in percentage). The value of the duty ratio becomes larger as the operation state of the engine 11 becomes worse or the temperatures of the coolant and the intake gas becomes higher.

The clutch 13 is operated in accordance with a clutch control signal Sc (refer to FIG. 3) outputted from the controller 50 (the details will be described later). The pressure control valve 27 has an impressed voltage corresponding to the value of the clutch control signal Sc. The pressure control valve 27 opens its valve in accordance with the magnitude of the impressed voltage. When the pressure control valve 27 is open, the oil passage 82a communicates with the oil pipe 14a on the high pressure side, and thus, the pressure in the piston chamber 87 rises. When the pressure control valve 27 is closed, the oil passage 82a communicates with the oil pipe 14b on the low pressure side, and thus, the pressure in the piston chamber 87 drops. The higher the impressed voltage becomes, the higher the pressure in the piston chamber 87 becomes. The lower the impressed voltage becomes, the lower the pressure in the piston chamber 87 becomes. When the pressure force in the piston chamber 87 rises, the piston 85 presses the pairs of friction discs 83, 84.

When being brought into contact by being pressed, the respective pairs of the friction discs 83, 84 transmit the rotation of the input shaft 80 to the output shaft 81 by the friction force to rotate the fan 12. On the contrary, when the pressure in the piston chamber 87 becomes low, the force with which the piston 85 presses the respect pairs of friction discs 83, 84 is weakened. When the force of the piston 85 is weakened, the respective pairs of friction discs 83, 84 are mutually separated by the pressing force of the washer springs 86 to discontinue the transmission of the rotation of the input shaft 80 to the output shaft 81, whereby the rotation of the fan 12 is weakened. In this way, the rotational speed of the fan 12 is controlled by varying the pressure in the piston chamber 87.

At this time, the clutch 13 is supplied into the clutch 13 with oil from the oil passage 82b to perform lubrication between the friction discs 83, 84. Thereafter, the oil supplied in the clutch 13 is discharged from the oil passage 82c. Due to the oil, a force that transmits the rotation of the input shaft 80 to the output shaft 81 through the oil between the respective pairs of friction discs 83 and 84, that is, a drag torque is generated even when the respective pairs of the friction discs 83, 84 are not in contact.

The magnitude of the drag torque depends on the viscosity of the oil, the gap between the friction discs 83 and 84, and the rotational speed of the engine 11. Since the oil temperature and the engine rotational speed go to change in dependence on the state in use, the clutch characteristic varies at all times. Therefore, in the present embodiment, the clutch control signal Sc-cc (refer to FIG. 3) is calculated in correspondence to the clutch characteristic varying, so that the rotational speed of the fan 12 is controlled to become appropriate. Hereinafter, description will be made regarding the specific control of the clutch control device according to the present embodiment.

Figure 3:
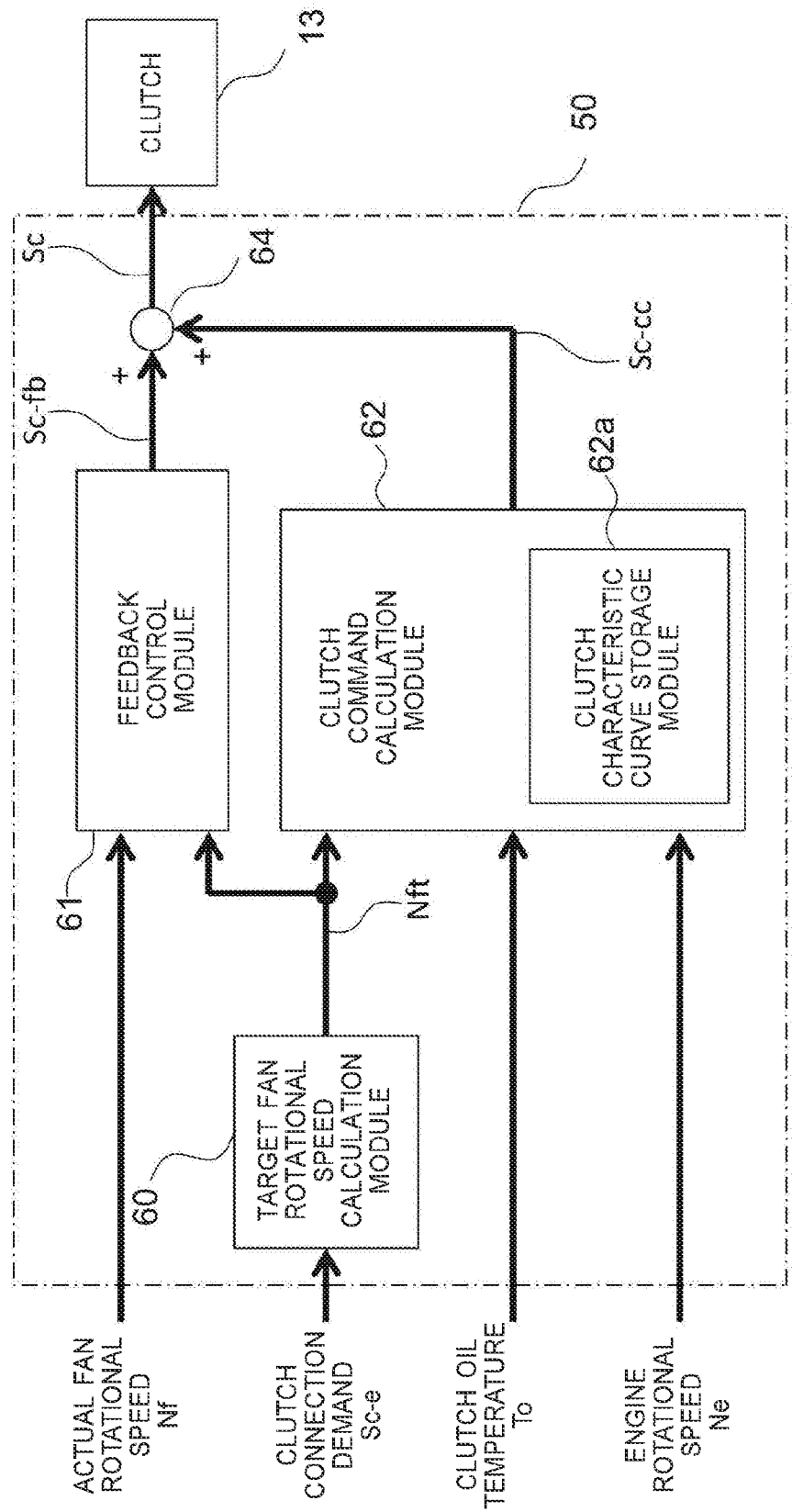
FIG. 3 is a function block diagram showing an internal configuration of a controller in a clutch control device according to a first embodiment.

FIG. 3 is a function block diagram showing an internal configuration of the controller 50 in the clutch control device according to the first embodiment. The controller 50 in the first embodiment is configured by the use of hardware that, for example, includes a CPU (Central Processing Unit) not shown, storage devices like a ROM (Read Only Memory) and an HDD (Hard Disc Drive) storing various programs to execute the processing by the CPU, and a RAM (Random Access Memory) that becomes a working area for the CPU in executing the programs.

As shown in FIG. 3, the controller 50 includes a target fan rotational speed calculation module 60 that calculates a target fan rotational speed Nft, a clutch command calculation module 62 that generates a clutch control signal Sc-cc (first clutch control signal), a feedback control module 61 that generates a clutch control signal Sc-fb (second clutch control signal), and an adder 64 that adds the clutch control signal Sc-cc and the clutch control signal Sc-fb to output a clutch control signal Sc (third clutch control signal). Further, the clutch command calculation module 62 has a clutch characteristic curve storage module 62a that stores a plurality of clutch characteristic curves.

The controller 50 receives from an engine controller 25 for the engine 11 a clutch connection demand Sc-e to input the same to the target fan rotational speed calculation module 60. The target fan rotational speed calculation module 60 determines a target fan rotational speed Nft based on the clutch connection demand Sc-e. The target fan rotational speed Nft determined by the target fan rotational speed calculation module 60 is inputted to the feedback control module 61 and the clutch command calculation module 62.

The feedback control module 61 has also inputted to the feedback control module 61 an actual fan rotational speed Nf detected by the fan rotational speed sensor 31, and the feedback control module 61 outputs the clutch control signal Sc-fb meeting the difference between the actual fan rotational speed Nf and the target fan rotational speed Nft.

In addition to the target fan rotational speed Nft, a clutch oil temperature To detected by the oil temperature sensor 33 and the engine rotational speed Ne detected by the engine rotational speed sensor 32 are inputted to the clutch command calculation module 62. Based on the clutch oil temperature To and the engine rotational speed Ne inputted to the clutch command calculation module 62, the clutch command calculation module 62 chooses an appropriate clutch characteristic curve from the plurality of clutch characteristic curves stored in the clutch characteristic curve storage module 62a. Then, the clutch command calculation module 62 makes reference to the chosen clutch characteristic curve to output a clutch control signal Sc-cc meeting the input target fan rotational speed Nft.

The adder 64 adds the clutch control signal Sc-fb and the clutch control signal Sc-cc both inputted to the adder 64 to output the clutch control signal Sc to the clutch 13. By operating the clutch 13 in accordance with the clutch control signal Sc, the fan rotational speed of the fan 12 is controlled adequately.

Figure 4:
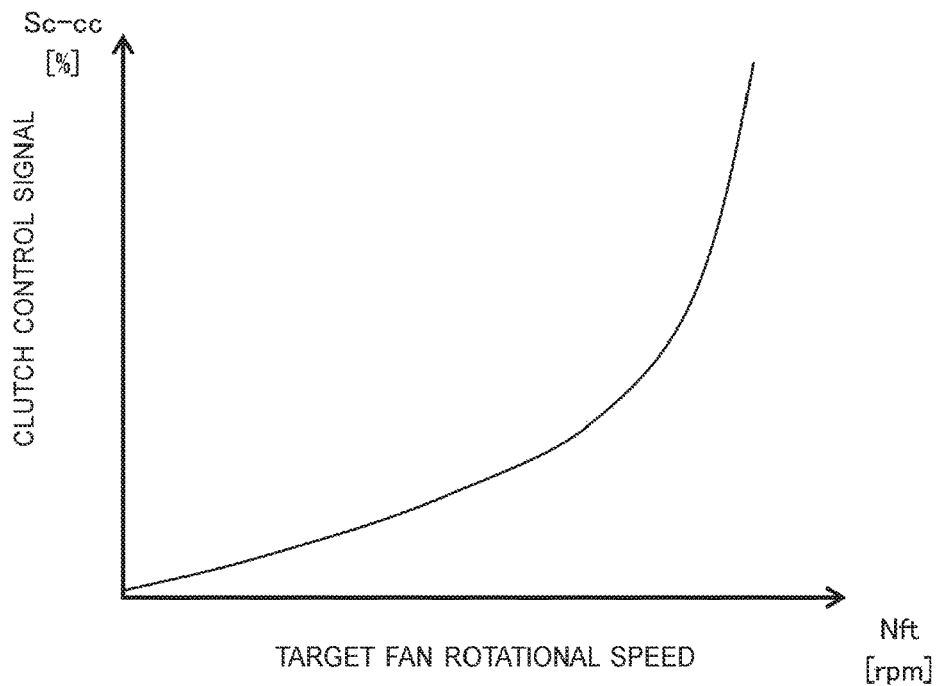
FIG. 4 is a graph showing a clutch characteristic curve.

Next, the clutch characteristic curve will be described with reference to FIG. 4. FIG. 4 is a graph showing the clutch characteristic curve. The clutch characteristic curve is one representing the relation between the target fan rotational speed Nft and the clutch control signal Sc-cc and is a curve by which, as shown in FIG. 4, the clutch control signal Sc-cc is unmistakably determined upon determination of the target fan rotational speed Nft. The clutch characteristic curve can be generated experimentally by inputting connection signals to the clutch 13 connected to the engine 11 that is being driven at a fixed rotational speed and then, by measuring respective rotational speeds of the output shaft 81 of the clutch 13 that is rotated in response to the respective connection signals.

Figure 5:
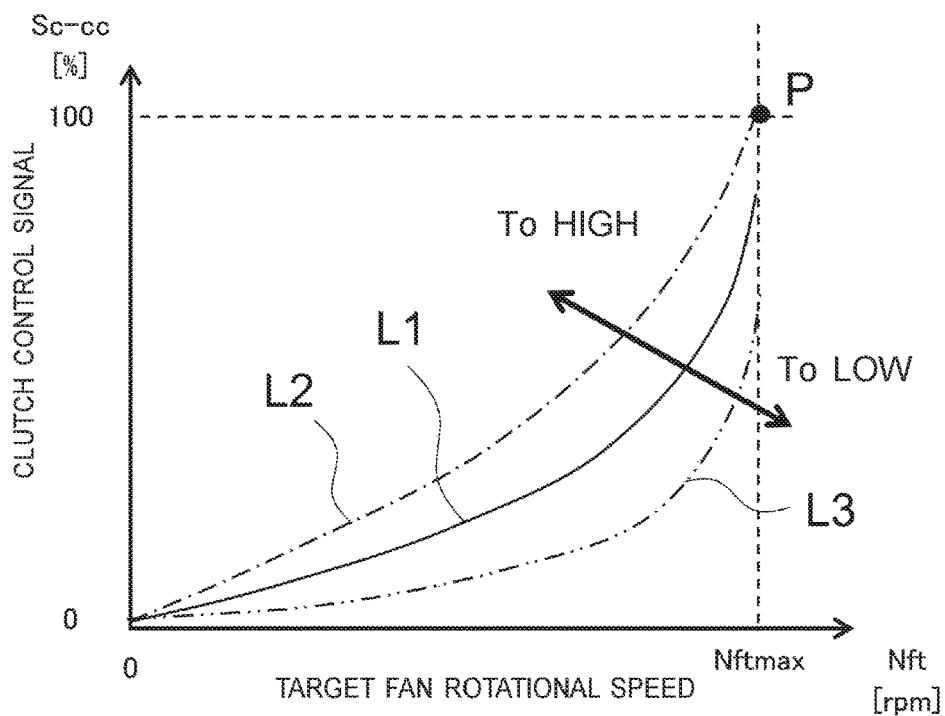
FIG. 5 is a graph showing clutch characteristic curves for respective clutch oil temperatures.

Next, with reference to FIG. 5, description will be made regarding the influence on the clutch characteristic caused by changes in the clutch oil temperature To. FIG. 5 is a graph showing clutch characteristic curves for respective clutch oil temperatures. As shown in FIG. 5, the clutch 13 changes the characteristic in dependence on the clutch oil temperature To. Where a clutch characteristic curve L1 is taken as a base, when the clutch oil temperature To becomes high, the clutch characteristic curve is shifted like a clutch characteristic curve L2 to the upper left of the clutch characteristic curve L1, that is, comes close to a straight line linking the origin (0, 0) to a point P (Nftmax, 100) to be exact. On the contrary, when the clutch oil temperature To becomes low, the clutch characteristic curve becomes a convex shape toward the lower right like a clutch characteristic curve L3.

Since the viscosity of oil becomes low as the temperature rises and becomes high as the temperature drops, generally, the drag torque becomes small as the temperature rises and becomes large as the temperature drops. In the rotation transmission while the drag torque is small, the friction force on the friction discs 83, 84 becomes dominant, so that the fan rotation speed changes in proportion to the clutch control signal Sc-cc. Further, when the drag torque is large, the drag torque added to the friction force on the friction discs 83, 84 causes the rotation transmission to become large, so that the fan rotational speed becomes high even when the friction of the clutch is small.

Figure 6:
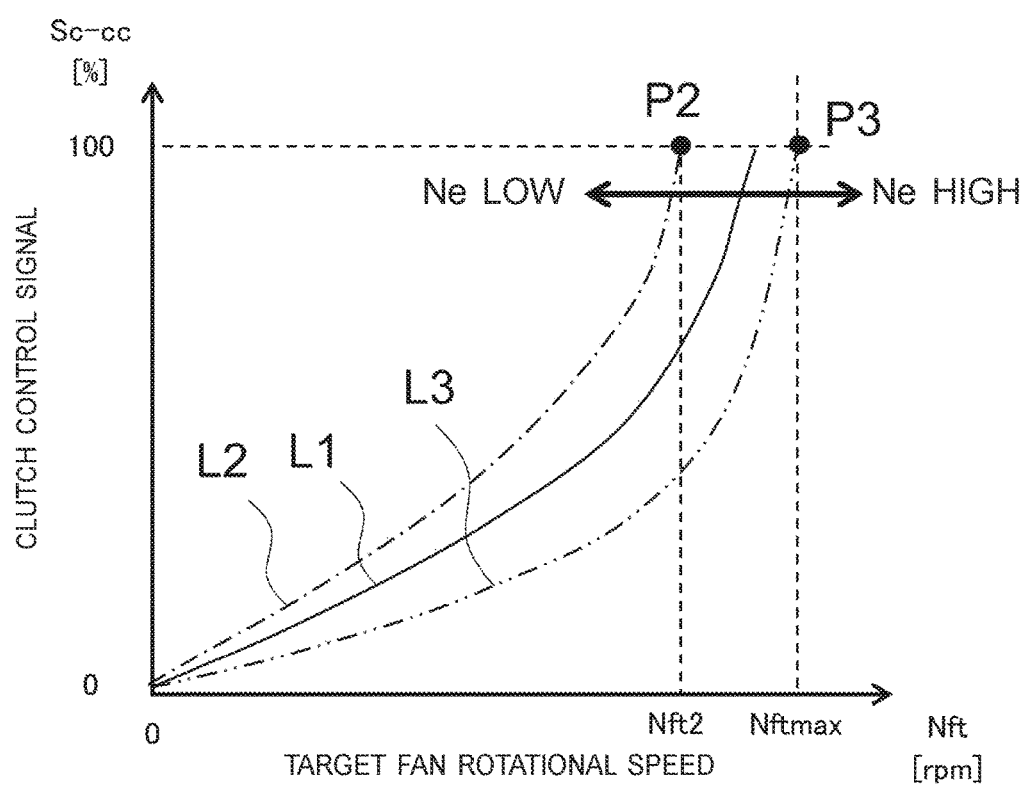
FIG. 6 is a graph showing clutch characteristic curves for respective engine rotational speeds.

Next, with reference to FIG. 6, description will be made regarding the influence on the clutch characteristic caused by changes in the engine rotational speed Ne. FIG. 6 is a graph showing clutch characteristic curves for respective engine rotational speeds. The drag torque of the clutch 13 becomes large as the rotational speed difference between the input shaft 80 and the output shaft 81 of the clutch 13 becomes large. Further, the rotational speed of the input shaft 80 of the clutch 13 becomes the maximum rotational speed of the output shaft 81, and thus, where the clutch characteristic curve L1 is taken as the base, when the engine rotational speed Ne becomes low, the clutch characteristic curve has the maximum value shifted like the clutch characteristic curve L2 to the left of the clutch characteristic curve L1, so that the curve comes close to a straight line linking the origin (0, 0) to a point P2 (Nft2, 100). On the contrary, when the engine rotational speed Ne becomes high, the clutch characteristic curve has the maximum value shifted to the right of the clutch characteristic curve L1, so that the curve deviates from a straight line linking the origin (0, 0) to a point P3 (Nftmax, 100) to become a convex shape toward the lower right.

Like this, the clutch characteristic curve changes variously in dependence on the change in the clutch oil temperature To and the change in the engine rotational speed Ne. Therefore, in the present embodiment, a plurality of clutch characteristic curves is stored in the clutch characteristic curve storage module 62a.

Figure 7:
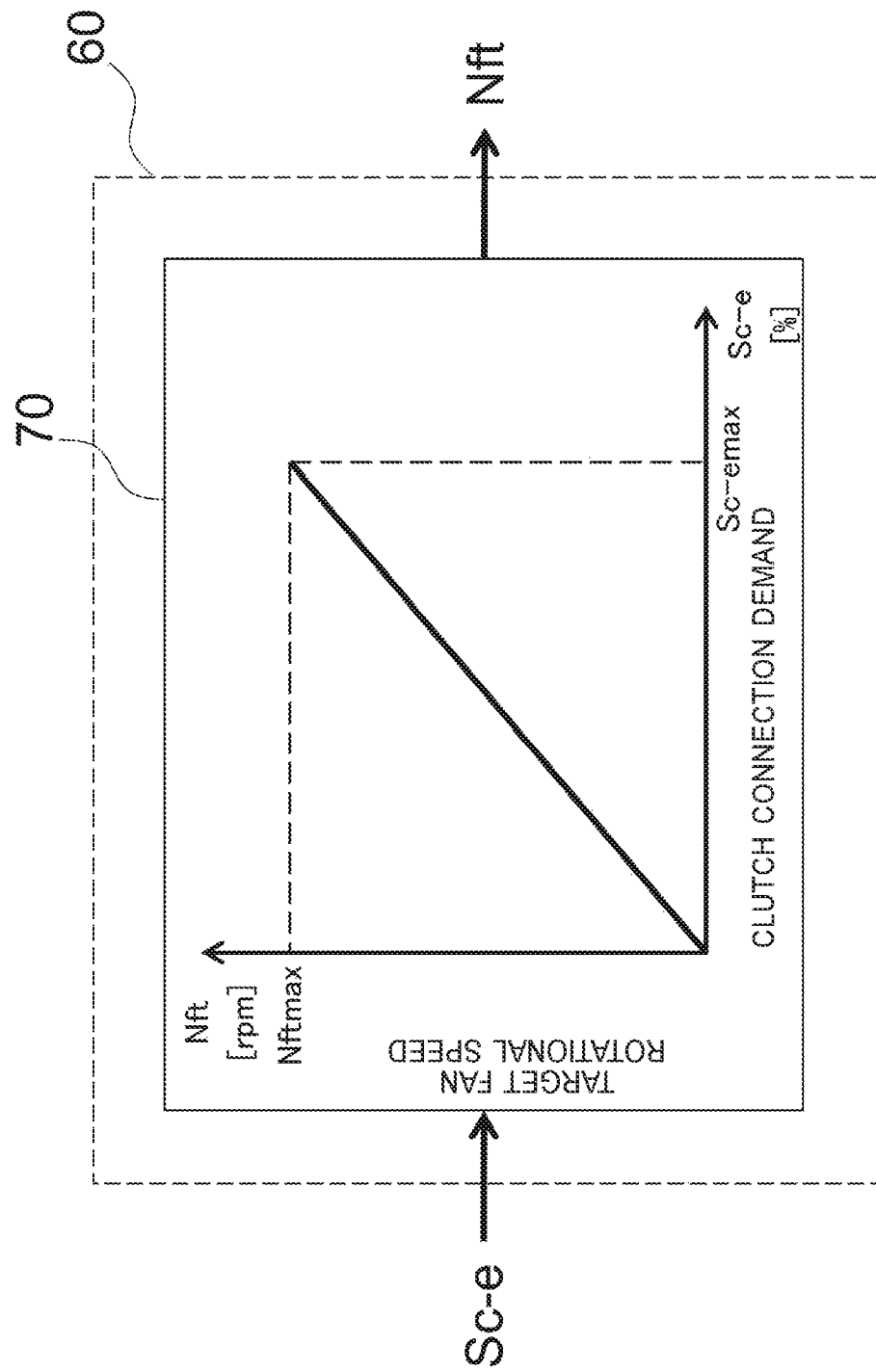
FIG. 7 is a diagram block showing the way of calculating a target fan rotational speed Nft by a target fan rotational speed calculation module.

Next, calculation methods in the respective calculation modules will be described. First of all, the calculation method in the target fan rotational speed calculation module 60 will be described with reference to FIG. 7. FIG. 7 is a diagram block showing the way of calculating the target fan rotational speed Nft by the target fan rotational speed calculation module 60. As shown in FIG. 7, the target fan rotational speed calculation module 60 has a lookup table 70 taking the clutch connection demand Sc-e on the axis of abscissas and the target fan rotational speed Nft on the axis of ordinate. When a clutch connection demand Sc-e is inputted, a target fan rotational speed Nft is determined by the lookup table 70 to be outputted. With consideration taken into cooling capacities of the radiator 21 and the intercooler 22, the lookup table 70 has target fan rotational speeds Nft that are set to become required fan rotational speeds meeting the clutch connection demands Sc-e.

Figure 8:
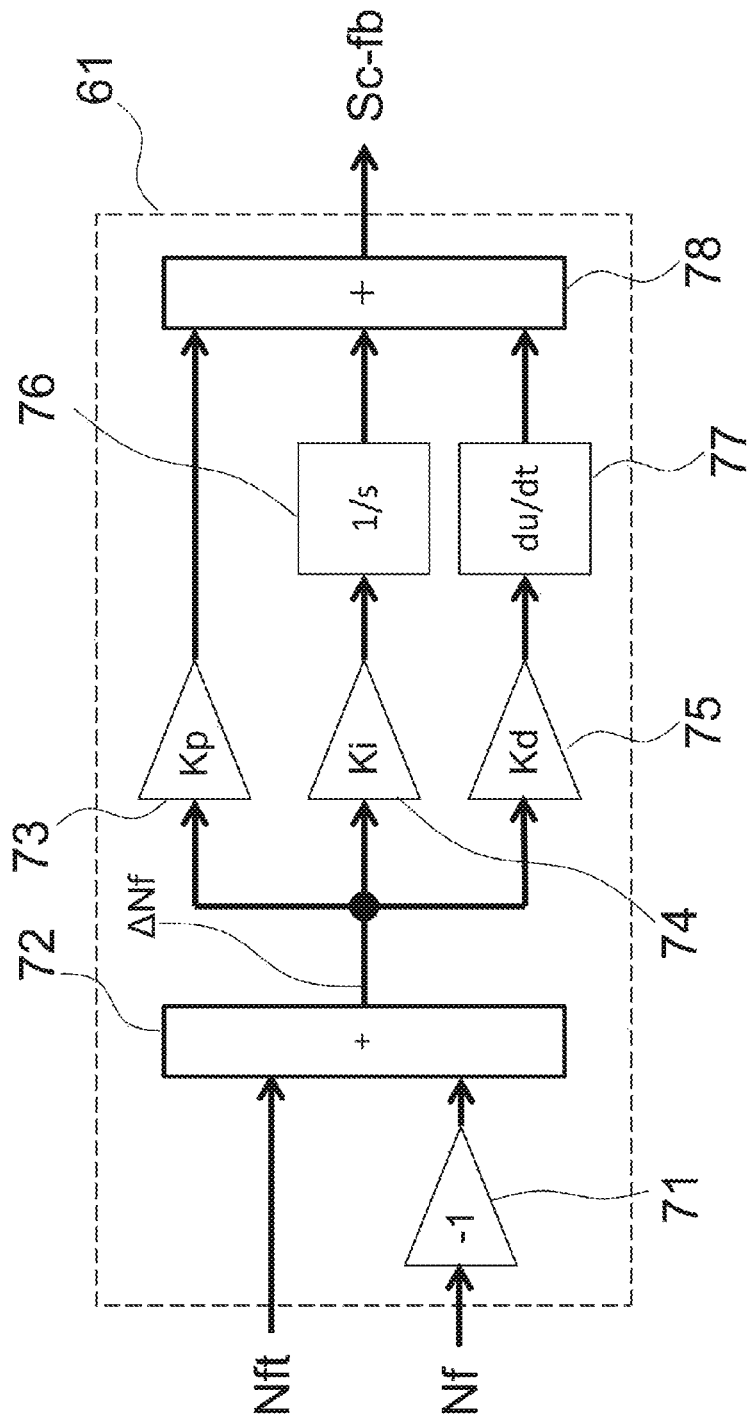
FIG. 8 is a detailed block diagram showing the way of calculating a clutch control signal Sc-fb by a feedback control module.

Next, the calculation method in the feedback control module 61 will be described with reference to FIG. 8. FIG. 8 is a detailed block diagram showing the way of calculating a clutch control signal Sc-fb by the feedback control module 61. As shown in FIG. 8, the feedback control module 61 has a gain amplifier 71, an adder 72, a proportional gain amplifier 73, an integration gain amplifier 74, a differential gain amplifier 75, an integrator 76, a differentiator 77 and an adder 78. The feedback control module 61, when having the actual fan rotational speed Nf and the target fan rotational speed Nft inputted to the feedback control module 61, multiplies the actual fan rotational speed Nf and −1 (minus one) by the gain amplifier 71 and calculates the difference ΔNf between the product and the target fan rotational speed Nft.

The difference ΔNf is made to diverge into three signals, of which a first signal is multiplied by a gain Kp at the proportional gain amplifier 73, a second signal is multiplied by a gain Ki at the integration gain amplifier 74 and is then integrated at the integrator 76, and a third signal is multiplied by a gain Kd at the differential gain amplifier 75 and is then differentiated at the differentiator 77. These three signals are added by the adder 78 and is outputted as the clutch control signal Sc-fb.

Incidentally, by setting 0 (zero) as the gain values of the proportional gain amplifier 73 and the differential gain amplifier 75, the use as I (Integral) control becomes possible. The gain values of the proportional gain amplifier 73, the integration gain amplifier 74 and the differential gain amplifier 75 are experimentally calculated and set as those values that do not cause divergence nor oscillation.

Figure 9:
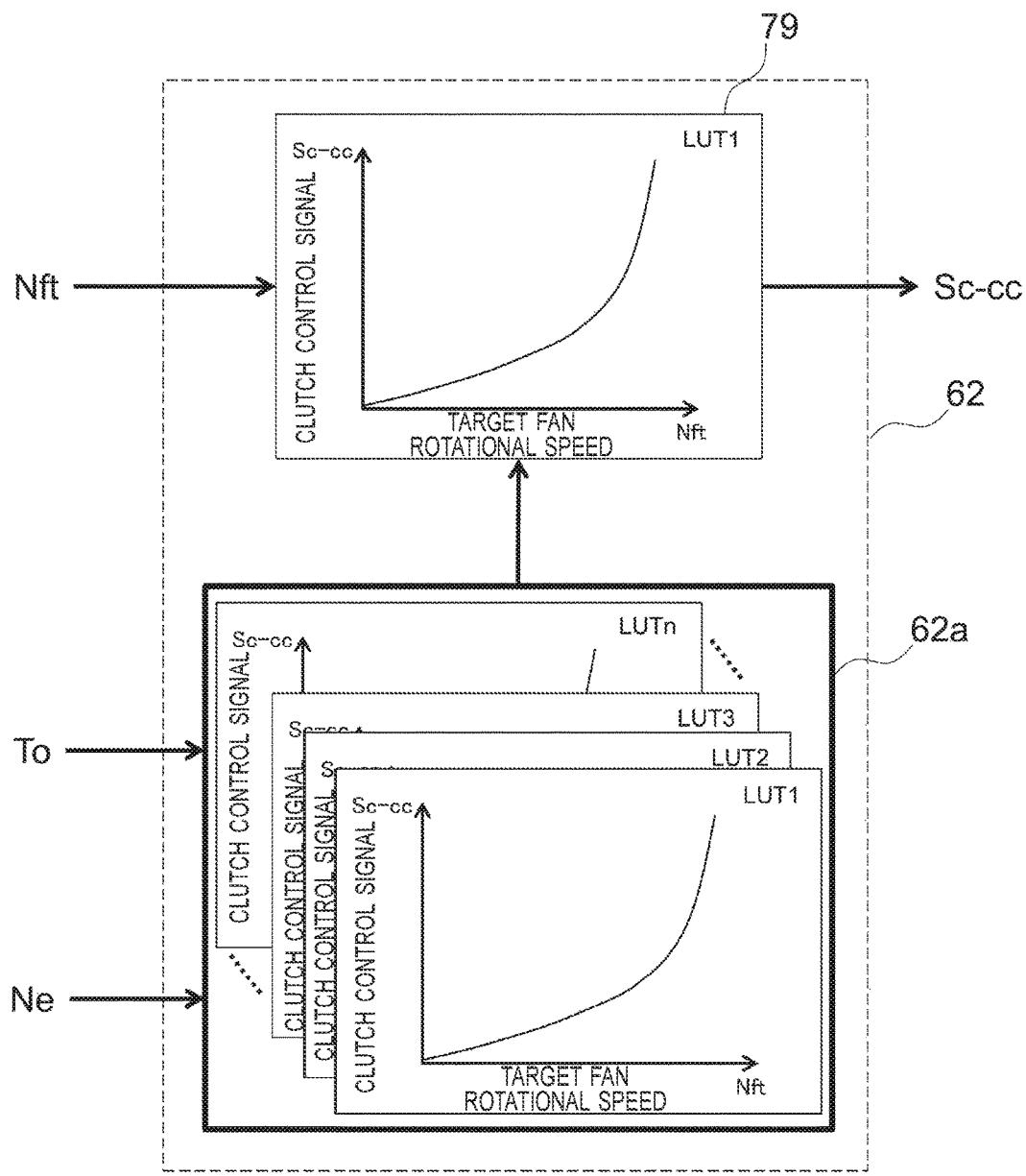
FIG. 9 is a detailed block diagram showing the way of calculating a clutch control signal Sc-cc by a clutch command calculation module.

Next, the calculation method in the clutch command calculation module 62 will be described with reference to FIG. 9. FIG. 9 is a detailed block diagram showing the way of calculating the clutch control signal Sc-cc by the clutch command calculation module 62. As shown in FIG. 9, the clutch characteristic curve storage module 62a stores clutch characteristic curves LUT1 through LUTn. The value of "n" is determined as an adequate number in dependence on the range in use of the engine rotational speed, the range of the clutch oil temperature To and the interval at which the clutch characteristic curve is created. The interval at which the clutch characteristic curve is created is preferable to be, at a minimum, every 200 rpm of the engine rotational speed and every 10 degrees of the clutch oil temperature.

When having the clutch oil temperature To and the engine rotational speed Ne inputted to the clutch command calculation module 62, the clutch command calculation module 62 chooses one clutch characteristic curve 79 meeting the clutch oil temperature To and the engine rotational speed Ne inputted to the clutch command calculation module 62 from the clutch characteristic curves LUT1 through LUTn stored in the clutch characteristic curve storage module 62a. The clutch command calculation module 62 applies the target fan rotational speed Nft to the chosen clutch characteristic curve 79 to extract and output a clutch control signal Sc-cc meeting the target fan rotational speed Nft.

The clutch control signal Sc-cc and the clutch control signal Sc-fb calculated in this way are added at the adder 64 as mentioned earlier, and the added value is outputted from the controller 50 to the clutch 13 as the clutch control signal Sc meeting the target fan rotational speed Nft. Therefore, the operation of the pressure control valve 27 is controlled in accordance with the clutch control signal Sc. As a consequence, the pressure in the piston chamber 87 becomes a desired value, and the output shaft 81 of the clutch 13 is rotated at a rotational speed taking the drag torque into consideration.

Like this, in the present embodiment, the operation of the clutch 13 is controlled in dependence on the clutch control signal Sc that is generated from the clutch control signal Sc-cc taking the clutch condition in the actual state into consideration and the clutch control signal Sc-fb taking into consideration the divergence between the target value and the present value of the fan rotational speed which divergence is caused by the abrasion of the clutch 13 and the deterioration of oil. Accordingly, it becomes possible to obtain the fan rotational speed quickly (high in responsibility) and accurately, and hence, it is possible to decrease an excessive fan power and to lessen the quantity of fuel consumption.

Second Embodiment

Figure 10:
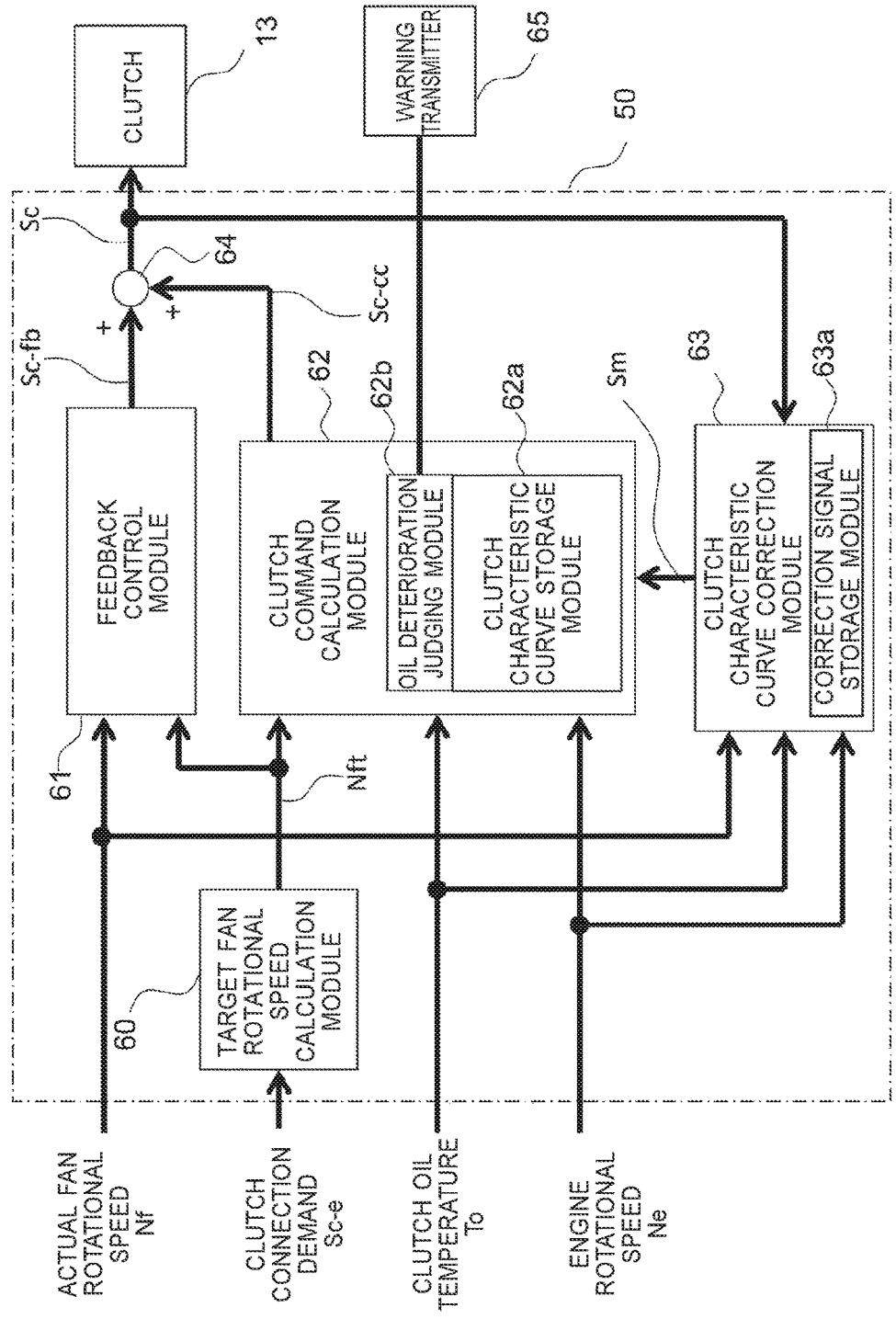
FIG. 10 is a function block diagram showing an internal configuration of a controller in a clutch control device according to a second embodiment.

Next, description will be made regarding a clutch control device according to a second embodiment of the present invention. FIG. 10 is a function block diagram showing an internal configuration of the controller 50 in the clutch control device according to the second embodiment. As shown in FIG. 10, the principal feature of the second embodiment resides in that the controller 50 is configured to further include an oil deterioration judging module 62b for judging the deterioration of the engine oil and a clutch characteristic curve correction module 63 for correcting the clutch characteristic curve. Therefore, the following description will be made mainly regarding these featured portions, while description will be omitted about the configurations that are the same or identical with those in the foregoing first embodiment.

As shown in FIG. 10, the clutch characteristic curve correction module 63 receives the actual fan rotational speed Nf, the clutch oil temperature To, the engine rotational speed Ne and the clutch control signal Sc and generates a clutch characteristic curve correction signal Sm by calculation. The clutch characteristic curve correction signal Sm is inputted to the clutch characteristic curve storage module 62a, and the clutch characteristic curve storage module 62a corrects the clutch characteristic curve stored in the clutch characteristic curve storage module 62a. Incidentally, the correction frequency of the clutch characteristic curve is preferable to be the degree of once a day. This is because making the correction frequency high results in the interference with the complement of the difference in the rotational speed which complement is given by the feedback control, and thus causes a hunting to occur whereby it becomes difficult to control the fan rotational speed.

The clutch characteristic curve correction module 63 has a correction signal storage module 63a storing the clutch characteristic curve correction signal Sm. The clutch characteristic curve correction signal Sm calculated during the driving of the engine 11 is once stored in the correction signal storage module 63a. Then, in the stop processing of the engine 11, the clutch characteristic curve correction signal Sm is transmitted to the clutch characteristic curve storage module 62a, and the clutch characteristic curve is corrected. That is, the clutch characteristic curve is corrected each time the operation of the hydraulic excavator is stopped.

Figure 11:
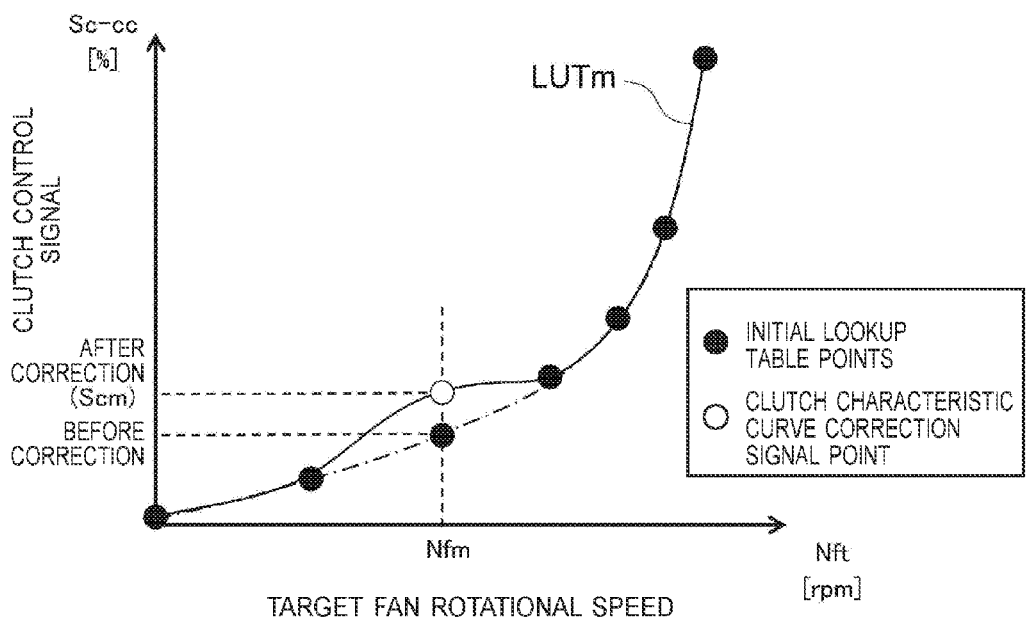
FIG. 11 is a graph showing a clutch characteristic curve before a correction and that after the correction.

A correction method of the clutch characteristic curve will be described with reference to FIG. 11. FIG. 11 is a graph showing a clutch characteristic curve before a correction and that after the correction. As shown in FIG. 11, the clutch characteristic curve correction signal Sm is defined by a correction clutch characteristic curve number LUTm, a correction target rotational speed Nfm and a correction clutch control signal Scm. The clutch characteristic curve storage module 62a, when receiving the clutch characteristic curve correction signal Sm from the clutch characteristic curve correction module 63, calls out the clutch characteristic curve of the correction clutch characteristic curve number LUTm and replaces the clutch control signal for the correction target rotational speed Nfm by a correction clutch control signal Scm. This correction is executed on every clutch characteristic curve correction signal Sm received, and the corrected clutch characteristic curve is newly stored (updated) in the clutch characteristic curve storage module 62a. In this way, at the time of the operation start of the hydraulic excavator, the operation of the clutch 13 can be controlled at all times in accordance with the newest clutch characteristic curve. Therefore, it is possible to keep the rotational speed of the fan 12 always in the optimum state.

Figure 12:
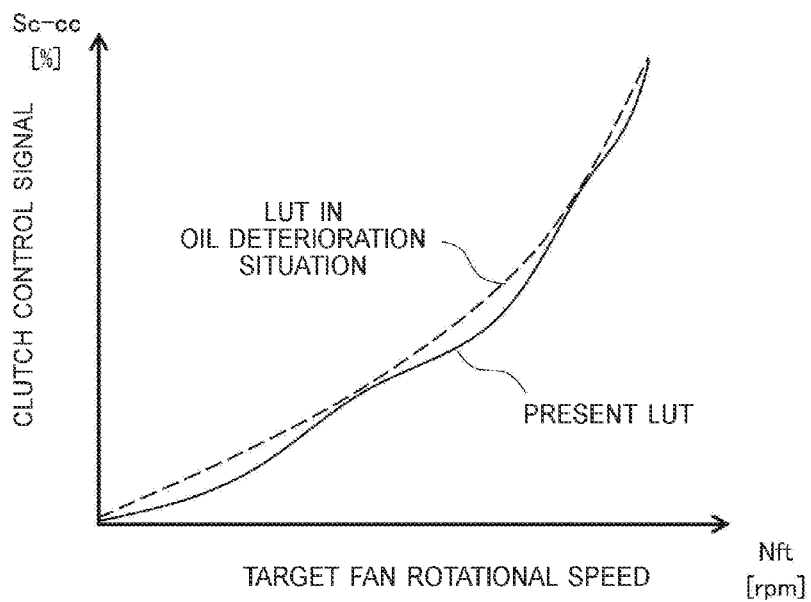
FIG. 12 is a graph showing the comparison between the present clutch characteristic curve and a clutch characteristic curve in the situation of oil deterioration.

Further, in the second embodiment, the clutch command calculation module 62 has the oil deterioration judging module 62b that judges the deterioration of oil. Further, for the purpose of judging oil deterioration, in the clutch characteristic curve storage module 62a, a plurality of clutch characteristic curves in an oil deterioration situation shown in FIG. 12, for example, are stored each in association with the clutch oil temperatures To and the engine rotational speeds Ne. FIG. 12 is a graph showing the comparison between the present clutch characteristic curve and a clutch characteristic curve in the situation of oil deterioration.

The oil deterioration judging module 62b compares the present clutch characteristic curve with the clutch characteristic curve in the situation of oil deterioration and, if the both are approximate, issues a warning to a warning transmitter (alarm) 65 to urge the change of the oil (engine oil) (refer to FIG. 10). Incidentally, for the clutch characteristic curve in the situation of oil deterioration, it can be done that the clutch characteristic is measured on the oil having been used for the time period in use becoming a standard for oil change, for example, the period of 2000 hours and is stored as the clutch characteristic curve in the situation of oil deterioration.

Figure 13:
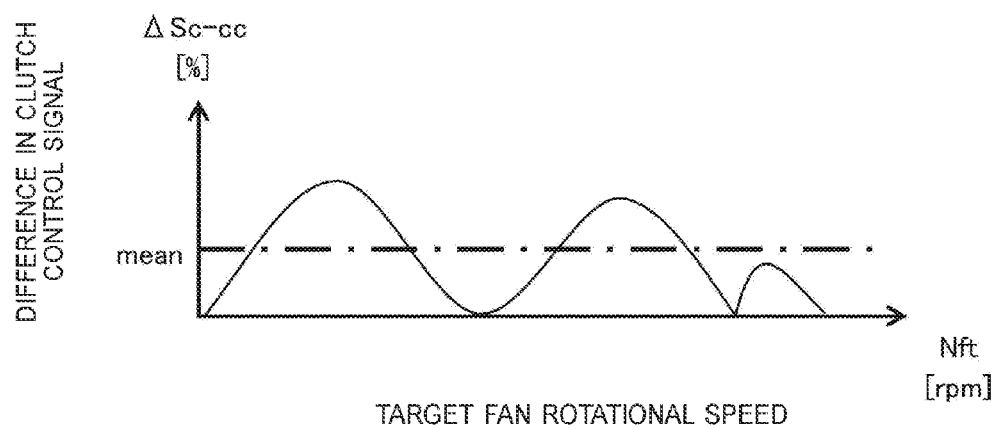
FIG. 13 is a graph describing the way of judging the deterioration of engine oil.
Figure 14:
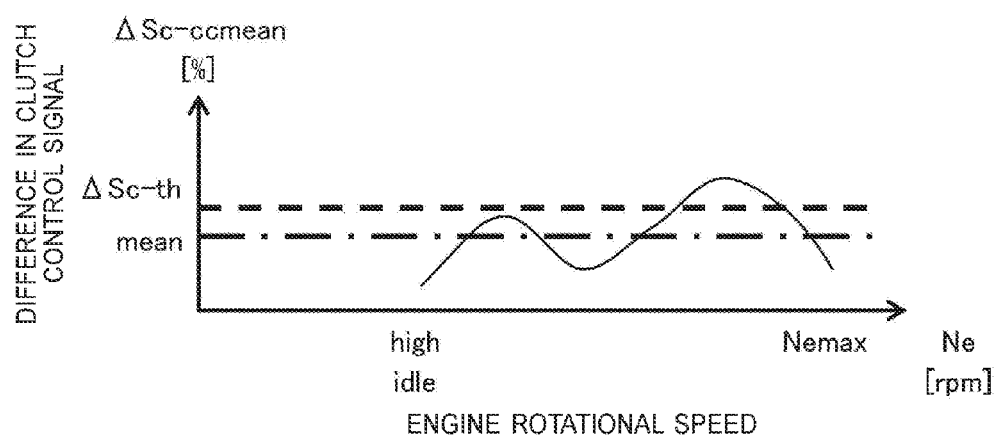
FIG. 14 is a graph describing a range for judging the deterioration of engine oil.

The way of judging the deterioration of the engine oil will be described. FIG. 13 is a graph describing the way of judging the deterioration of the engine oil, and FIG. 14 is a graph describing a range for judging the deterioration of the engine oil. As shown in FIG. 13, the oil deterioration judging module 62b picks up the differences throughout the target fan rotational speeds between the present clutch characteristic curve as the objective for judgment and the clutch characteristic curve in the situation of oil deterioration, then compares the average (mean) of the differences with a threshold value ΔSc-th for deterioration judgment, and, if the average is less than the threshold value ΔSc-th, judges that the oil has been deteriorated.

Then, the range for judging the oil deterioration may be determined by the comparison only in the state that the engine rotational speed is held at the maximum rotational speed. Alternatively, as shown in FIG. 14, the range may be determined in the way of picking up the differences between the present clutch characteristic curve and the clutch characteristic curve in the situation of oil deterioration over the range of the engine rotational speeds from a high idling to the maximum rotational speed, then calculating the average of all of the differences, and finally comparing the average with the threshold value ΔSc-th for deterioration judgment.

Figure 15:
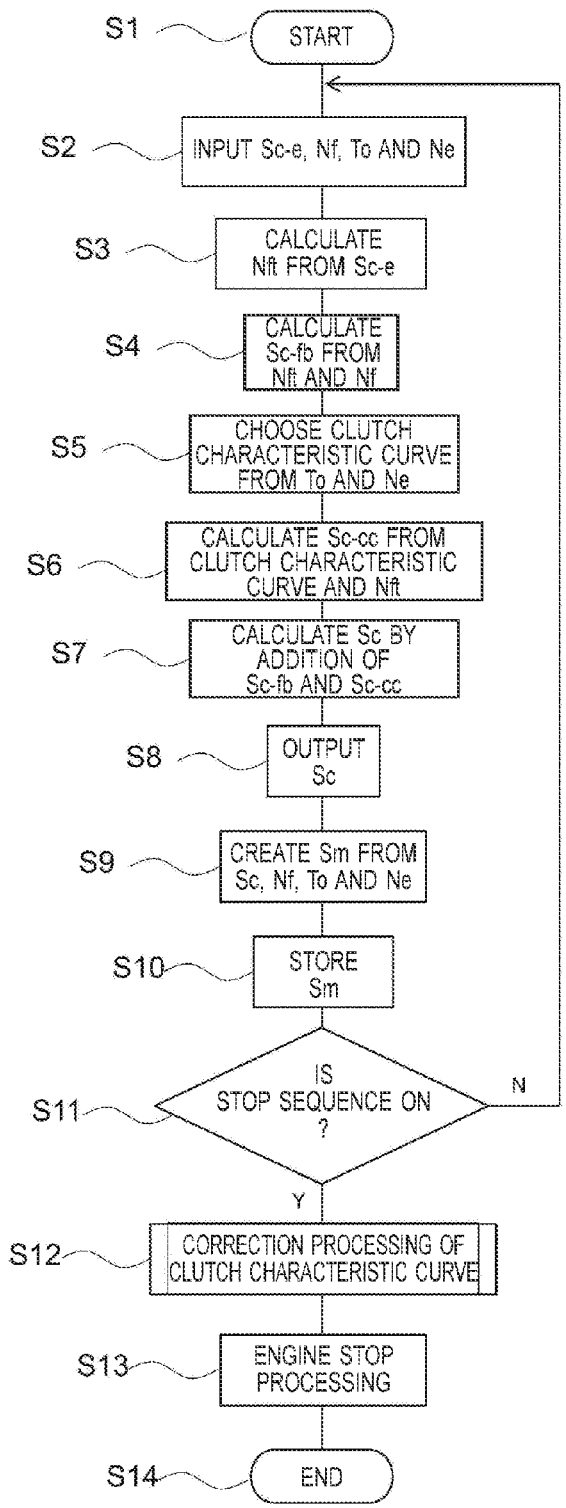
FIG. 15 is a flowchart showing a procedure for correcting the clutch characteristic curve by a controller.
Figure 16:
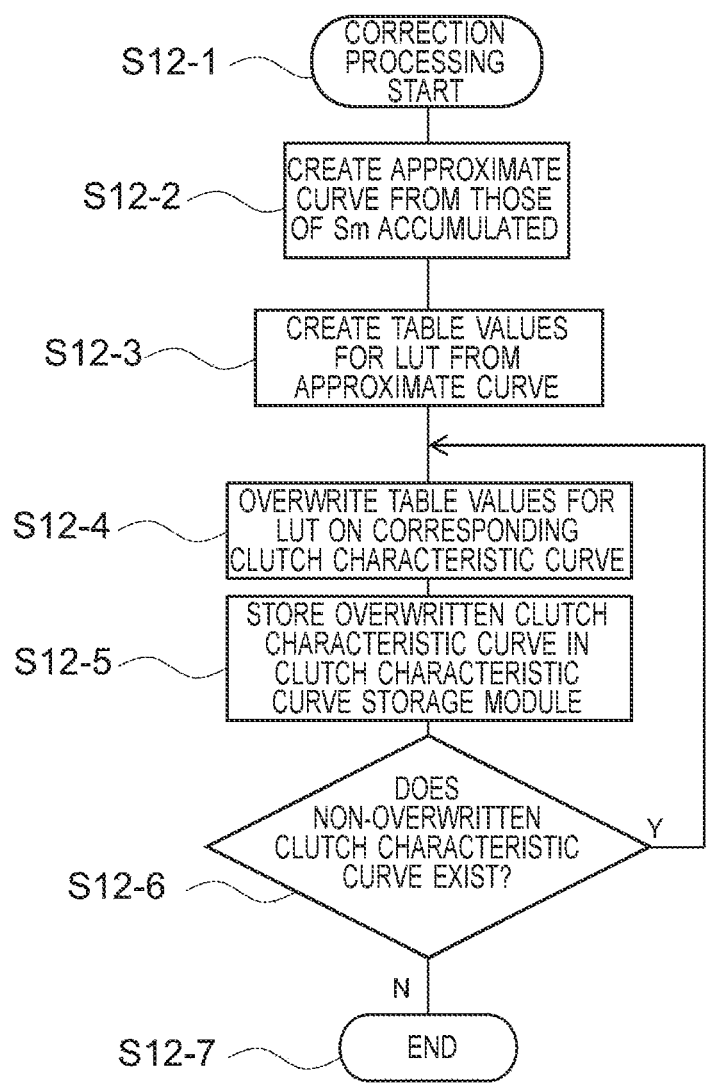
FIG. 16 is a flowchart showing a detailed procedure for the correction procedure defined in FIG. 15.

Next, a procedure for correcting the clutch characteristic curve by the controller 50 will be descried with reference to FIG. 15 and FIG. 16. FIG. 15 is a flowchart showing the procedure for correcting the clutch characteristic curve by the controller 50, and FIG. 16 is a flowchart showing a detailed procedure for a correction step defined in FIG. 15.

The control begins at a time point when the engine 11 is brought into driving, that is, a time point when the operation of the hydraulic excavator is started (step S1), and the clutch connection demand Sc-e, the actual fan rotational speed Nf, the clutch oil temperature To and the engine rotational speed Ne are inputted from the engine controller 25 of the engine 11 to the controller 50 (step S2). The target fan rotational speed calculation module 60 calculates the target fan rotational speed Nft from the clutch connection demand Sc-e inputted at the step S2 (step S3). The feedback control module 61 calculates the clutch control signal Sc-fb from the target fan rotational speed Nft calculated at the step S3 and the actual fan rotational speed Nf inputted at the step S2 (step S4).

The clutch command calculation module 62 chooses a clutch characteristic curve optimum to the present state whose curve corresponds to the clutch oil temperature To and the engine rotational speed Ne both inputted at the step S2, from the plurality of clutch characteristic curves stored in the clutch characteristic curve storage module 62a (step S5). Then, the clutch command calculation module 62 calculates the clutch control signal Sc-cc from the clutch characteristic curve chosen at the step S5 and the target fan rotational speed Nft calculated at the step S3 (step S6).

The adder 64 adds the clutch control signal Sc-fb calculated at the step S4 and the clutch control signal Sc-cc calculated at the step S6 to obtain the clutch control signal Sc (step S7). The controller 50 outputs the clutch control signal Sc calculated at the step S7 to the clutch 13 (step S8).

The clutch characteristic curve correction module 63 creates the clutch characteristic curve correction signal Sm from the clutch control signal Sc calculated at the step S8 and the actual fan rotational speed Nf, the clutch oil temperature To and the engine rotational speed Ne all inputted at the step S2 (step S9). The clutch characteristic curve correction module 63 stores the clutch characteristic curve correction signal Sm created at step S9 in the correction signal storage module 63a during the driving of the engine 11 (step S10).

After that, the controller 50 judges whether or not the engine 11 has presently come into a stop sequence (step S11). The program proceeds to a step S12 if the engine 11 has come into the stop sequence, but returns to the step S2 if the engine 11 has not come into the stop sequence.

When the program proceeds to the step S12, the clutch characteristic curve correction signal Sm stored in the correction signal storage module 63a is outputted to the clutch characteristic curve storage module 62a. Then, the correction processing for the clutch characteristic curve is executed based on the clutch characteristic curve correction signal Sm. The details of the processing at the step S12 will be described with reference to FIG. 16. When the correction processing is started (step S12-1), the clutch characteristic curve storage module 62a creates an approximate curve of the clutch characteristic from the accumulated clutch characteristic curve correction signals Sm (step S12-2) and creates table values for a clutch characteristic curve LUT from the created approximated curve (step S12-3).

Subsequently, the clutch characteristic curve storage module 62a makes an overwriting on the clutch characteristic curve corresponding to the table values of the clutch characteristic curve LUT (step S12-4) and stores the overwritten clutch characteristic curve in the clutch characteristic curve storage module 62a (step S12-5). At a step S12-6, the program returns to step S12-4 if there exists any clutch characteristic curve having been not overwritten, but terminates the correction processing if not any (step S12-7). Then, the program is returned to the routine in FIG. 15, wherein after executing the stop processing for the engine 11 (step S13), the controller 50 finishes the processing (step S14).

Like this, according to the second embodiment, since the compensation of the clutch characteristic curve can be made by the clutch characteristic curve correction module 63, it is possible to control the rotational speed of the fan 12 more accurately with the present clutch state taken into consideration. Further, by judging the deterioration of the engine oil by the oil deterioration judging module 62b and by urging, by the use of the warning transmitter 65, the user to perform the change of the engine oil, it is possible to change the engine oil at an adequate timing, and it thus becomes possible to prevent the engine from being shortened in service life and from falling in a failure and hence to decrease the frequency of the repair and replacement of the engine.

Incidentally, the foregoing embodiments are the exemplifications for describing the present invention and are not intended to limit the scope of the present invention to the embodiments thereof only. Those skilled in the art can implement the present invention in various other modes without departing from the gist of the present invention. For example, the second embodiment is configured so that the oil deterioration judging module 62b judges the deterioration of the engine oil and issues a warning. Alternatively, unless it is particularly required to make an alert for the replacement of the engine oil, it is also possible to remove the configuration for the oil deterioration judging module 62b from the controller 50.

What is claimed is:

1. A clutch control device for a work machine comprising an engine, a wet clutch connected to the engine, a fan connected to an output shaft of the clutch, an engine rotational speed sensor adapted for detecting the rotational speed of the engine, an oil temperature sensor adapted for detecting a clutch oil temperature, a fan rotational speed sensor adapted for detecting the rotational speed of the fan, and a controller adapted for controlling the operation of the clutch, wherein the controller includes:
a target fan rotational speed calculation module that is configured to calculate a target fan rotational speed for the fan based on a clutch connection demand inputted;
a clutch characteristic curve storage module that, in association with the oil temperatures of the clutch and the rotational speeds of the engine, is configured to store a plurality of clutch characteristic curves each prescribing the relation between the target fan rotational speeds and control signals for the clutch;
a clutch command calculation module that is configured to choose one clutch characteristic curve from the plurality of clutch characteristic curves based on detection signals outputted from the oil temperature sensor and the engine rotational speed sensor and output with reference to the chosen clutch characteristic curve a first clutch control signal corresponding to the target fan rotational speed;
a feedback control module that is configured to output a second clutch control signal based on the difference between the target fan rotational speed and an actual fan rotational speed of the fan outputted from the fan rotational speed sensor; and
an adder that is configured to add the first clutch control signal and the second clutch control signal to output a third clutch control signal to the clutch.

2. The clutch control device for the work machine according to claim 1, wherein:
in the clutch characteristic curve storage module, a plurality of clutch characteristic curves in the situation of oil deterioration each prescribing the relation between the target fan rotational speed and the control signal for the clutch in the situation that the oil supplied to the clutch has deteriorated are beforehand stored in association with the clutch oil temperature and the rotational speed of the engine; and
the controller further includes an oil deterioration judging module that is configured to judge the deterioration of the oil in comparison of the clutch characteristic curve corresponding to the clutch oil temperature and the rotational speed of the engine with the clutch characteristic curve in the situation of oil deterioration.

3. The clutch control device for the work machine according to claim 2, further comprising:
an alarm that is configured to issue information on the result of a judgment of the oil deterioration judging module.

4. The clutch control device for the work machine according to claim 1, wherein the controller further includes
a clutch characteristic curve correction module that is configured to take as inputs the actual fan rotational speed, the clutch oil temperature, the rotational speed of the engine and the third clutch control signal and output a clutch characteristic curve correction signal for correcting the clutch characteristic curve stored in the clutch characteristic curve storage module, wherein the clutch characteristic curve storage module is configured to correct the clutch characteristic curve stored in itself based on the clutch characteristic curve correction signal.

5. The clutch control device for the work machine according to claim 4, wherein the controller further includes a correction signal storage module that is configured to store the clutch characteristic curve correction signal created by the clutch characteristic curve correction module, wherein the clutch characteristic curve correction module is configured to output the clutch characteristic curve correction signal stored in the correction signal storage module at the time of stopping of the engine.

* * * * *